Jan. 7, 1958  M. T. THORSSON  2,819,054
BINARY WEIGHING SYSTEM
Filed Aug. 19, 1955   3 Sheets-Sheet 2
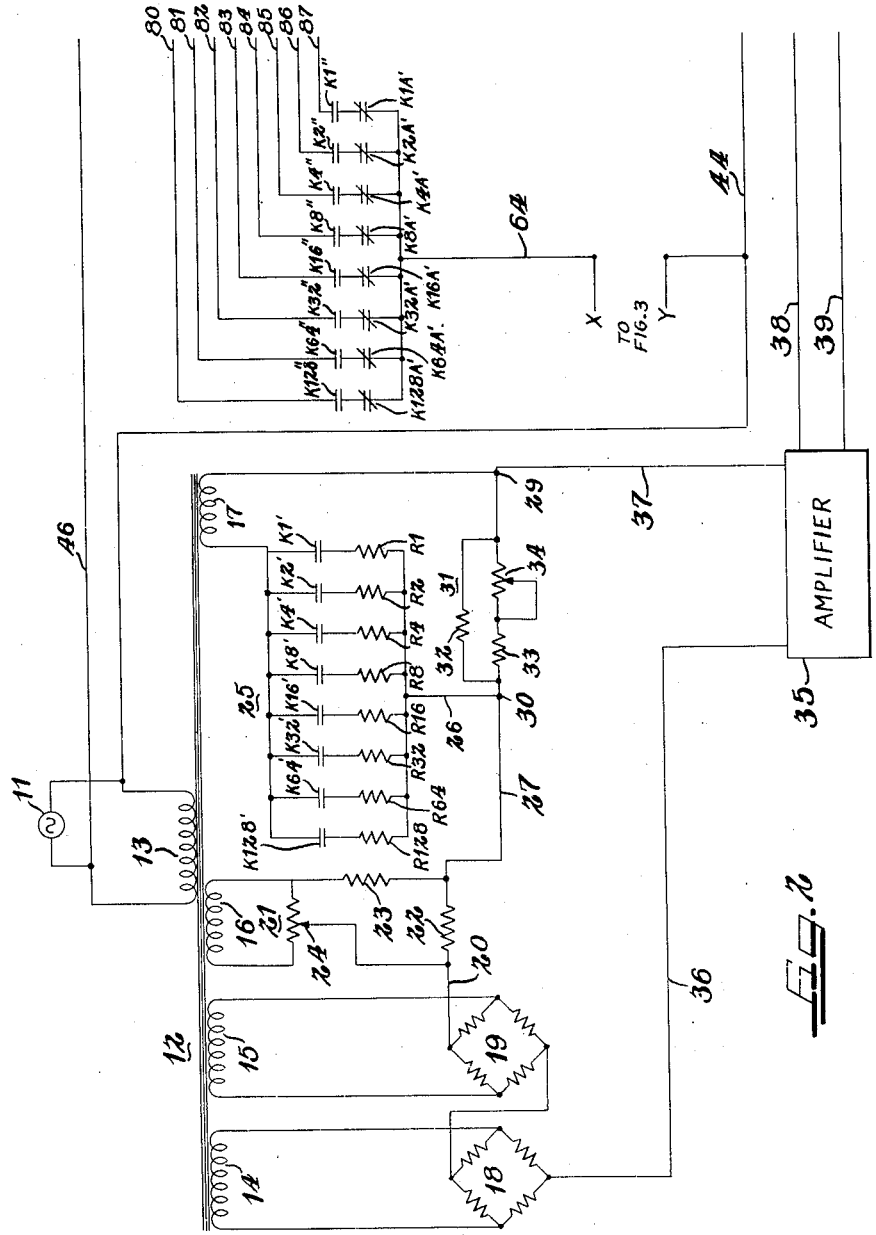
Inventor
Matthew T. Thorsson
Paul L. Koehn
Atty.

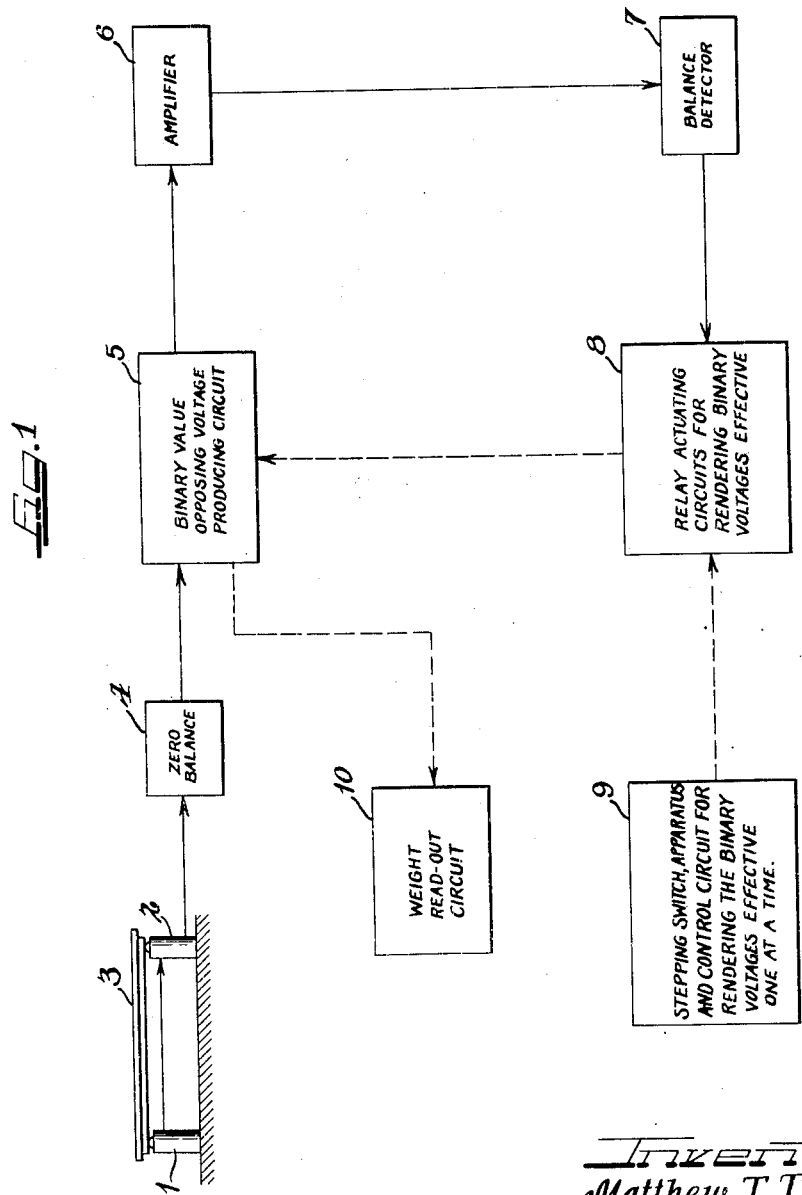

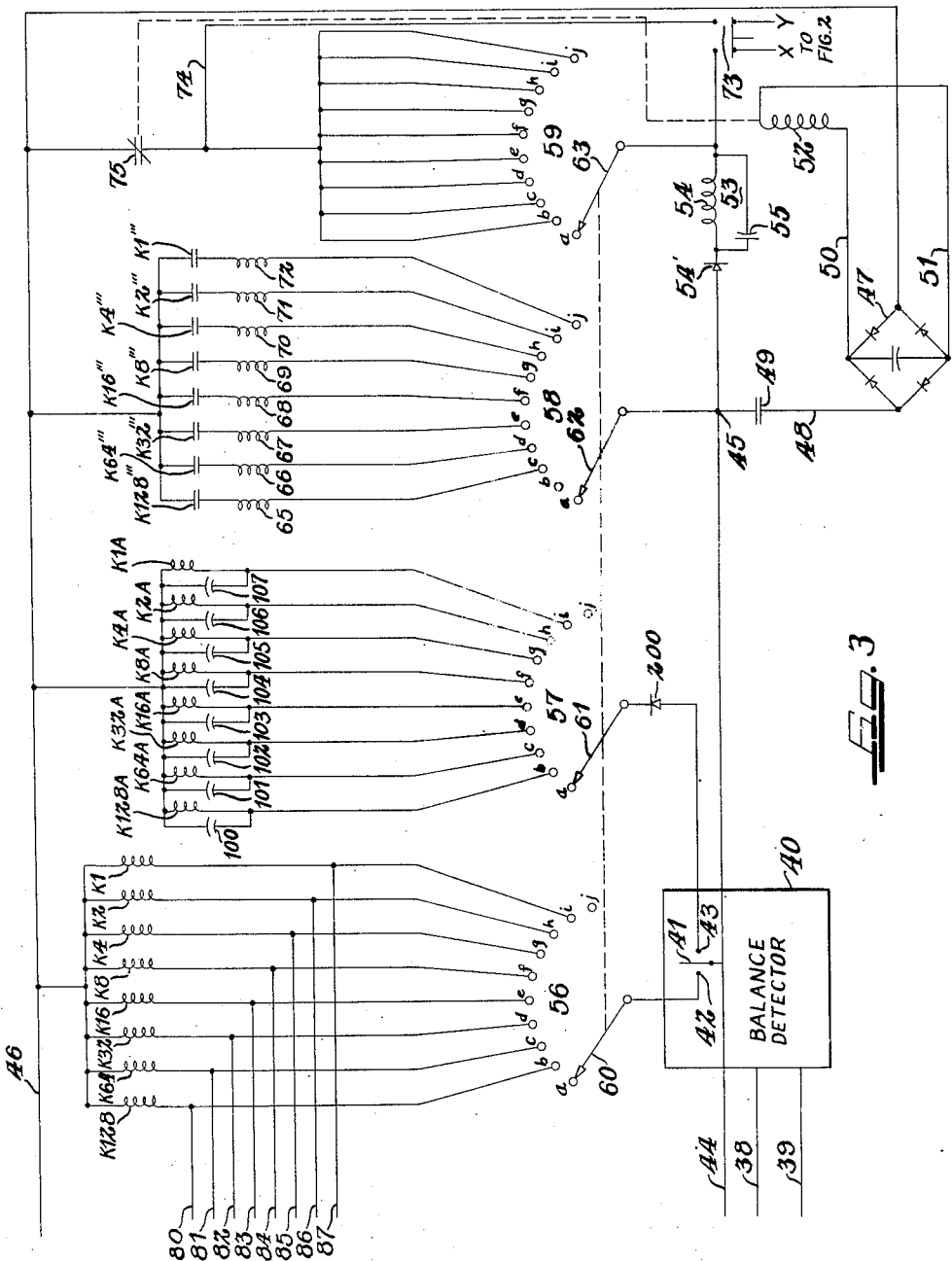

United States Patent Office 2,819,054
Patented Jan. 7, 1958

2,819,054

BINARY WEIGHING SYSTEM

Matthew T. Thorsson, Moline, Ill., assignor to Fairbanks, Morse & Co., Chicago, Ill., a corporation of Illinois Application August 19, 1955, Serial No. 529,527

16 Claims. (Cl. 265—70)

This invention relates generally to electrical weighing systems, and more particularly to such a system in which a binary system of numbers is utilized to obtain relatively quick and precise measurements with a simplified construction.

In its simplest form a weighing operation may be accomplished by placing the object whose weight is to be determined in a container coupled to one arm of a balanced beam and connecting a series of discrete known weights to the other arm of the balanced beam in such manner as to achieve a rebalance of the beam. The sum of the applied known weights is indicative of the weight of the unkown object. This process of applying weights to counterbalance an unknown object to determine its weight may be referred to as quantizing. In a more general sense quantizing may be defined as breaking down an analog quantity into a digitally coded quantity. Such latter quantity may be expressed in various numerical systems such as binary, decimal binary or decimal. Inasmuch as each of these numerical systems is conventional and familiar to those skilled in the weighing art any extended discussion of the fundamental basis for each system would be unduly repetitious.

However, in weighing applications employing a load generated voltage and a counterbalancing voltage, it has been found expeditious to utilize a binary numerical system in order to reduce the complexity of the circuitry utilized and to provide a unit having a minimum number of components. The desirability of the binary number system in generating a voltage counterbalancing the voltage indicative of the weight of the unknown object may be seen from the following chart. In this chart it is assumed that a scale device capable of determining a maximum weight of 511 pounds is to be considered and that the circuitry is arranged to introduce elements whose value is indicative of the digitally coded quantity of counterbalancing voltage generated in the device. Each column illustrates the number and value of the elements necessary to produce the requisite voltage for such a scale device. By using the principles of the chosen system any quantity may be weighed up to a maximum of 511 pounds in one pound increments.

*Chart I*

| Decimal | Decimal Binary | Binary |
|---|---|---|
| 1, 2, 3, 4, 5, 6, 7, 8, 9<br>10, 20, 30, 40, 50<br>60, 70, 80, 90<br>100, 200, 300, 400, 500 | 1, 2, 4, 8<br>10, 20, 40, 80<br>100, 200, 400 | 1, 2, 4, 8, 16, 32<br>64, 128, 256 |

From the above chart it may be readily seen that only nine elements are needed to produce a scale device if a binary number system is used. In fact, the advantages of the binary system becomes more apparent as the range of the scale is increased. In general, the complexity of circuitry increases as the number of elements increases, and under these circumstances a binary system is preferable to other arrangements. However, other numerical systems may be utilized following the principles of operation discussed hereinafter.

Additionally, in those applications in which a segregation of units by weight is desired, a plurality of gates controlled by a binary numerical system of weighing has proved more efficient than any other system and requires, again, the least number of elements.

The primary object of this invention is to provide an electrical weighing system in which information received by the sensing device of the system is counterbalanced by a circuit utilizing the principles of the binary numbering system and in which the converted binary information from the counterbalance circuit is reconverted into the decimal system in a read-out device.

Another object of this invention is to provide an electrical weighing system in which the number of electrical components between the sensing cells and the read-out system is materially reduced over prior systems while maintaining accuracy of measurement through the use of certain components representing numbers of the binary numbering system.

A more specific object of this invention is to provide an electrical weighing system in which a voltage developed by a sensing cell or cells is balanced out in an electrical system utilizing components which represent certain numbers of the binary numbering system.

Another object of this invention is to provide an electrical weighing or force measuring system in which a voltage developed by a load sensing cell or cells is opposed by a voltage created in a balancing circuit including components representing certain numbers of the binary numbering system with a subsequent read-out of the value of the load sensed when the voltages are equal.

A further object of this invention is to provide an electrical weighing or force measuring system which acts automatically to indicate the magnitude of a load applied to the system after the mere closure of a switch.

Another specific object of this invention is to provide an electrical weighing or force measuring system in which a voltage developed by a load sensing cell is opposed by a voltage created by the automatic proper selection of resistor elements in a balance circuit, each of the resistor elements representing a number in the binary numbering system.

With the foregoing, and other objects in view, the invention resides in the following specification and appended claims, certain embodiments of which are illustrated in the accompanying drawings in which:

Figure 1 is a schematic drawing in block form of the complete weighing system; and Figures 2 and 3 are schematic drawings partially in block form of the electrical circuitry comprising this invention.

This invention will be described as relating to weighing systems, but it is quite obvious that it could be utilized without substantial modification to measure other types of forces convertible into electrical signals.

Referring more particularly to Figure 1, a pair of load cells 1 and 2 are shown supporting a weighing platform 3. It is immaterial to the operation of the system whether one or a plurality of load cells are utilized. It is preferable, however, to use a load cell of the resistance strain gauge type, although other types of load cells, such as electrostatic, electromagnetic or movable anode vacuum tube may be utilized.

The combined electrical output from the cells 1 and 2 is fed in series through a zero balance device 4 which may be adjusted to remove any voltage created by the platform, or pan 3, and applied thereto in order that the only signal transmitted to the remainder of the system will represent the magnitude of an actual applied load.

The signal representative of the magnitude of an applied load is applied to a binary value opposing voltage producing circuit 5 and also to an amplifier 6. The output of the amplifier 6 is applied to a balance detector 7. The detector 7 is utilized to control the relay actuating circuits 8, which in turn control the build up of opposing voltage by the circuit 5.

A stepping switch system 9 is utilized to present the binary voltages created by circuit 5 one at a time for selection by the balance detector 7 and relay circuits 8.

After a load has been weighed, the weight information in binary number form is fed to a read-out system 10. The read-out system may be in the form of a printer, dial indicator or card puncher, and the information displayed thereby may be in binary form or may be converted into decimal form. In weighing scales, the information desired at circuit 10 is generally more useful in the decimal system, which the average person can readily interpret. Therefore, this invention contemplates a circuit at 10 which will convert the received binary information into decimal quantities for indication purposes. Alternatively, however, in sorting various units in terms of weight, a binary control system may be advantageously utilized in which case no conversion from the binary to the decimal system need be employed.

Referring now to Figures 2 and 3, the invention is set forth thereat in detailed schematic form. Power for the system is derived from a suitable 60 cycle source of alternating current at 11. A transformer 12, connected to source 11 is provided with a primary winding 13 and secondary windings 14, 15, 16, and 17. Series connected across secondaries 14 and 15 are resistance bridge-type load cells 18 and 19. Resistance type load cells suitable for this application are conventional in nature and are commercially available. Such load cells are connected in a balanced bridge arrangement which produces a voltage signal which is a linear function of the magnitude of the load applied to the weighing platform 3. A conductor 20 connects one side of the cell 19 with the zero balance bridge 21. Bridge 21 includes secondary 16 of transformer 12, fixed resistors 22 and 23, and an adjustable resistor 24. Any error voltage created by the cells 18 and 19, due to the weight of the platform—such as platform 3 in Figure 1—may be balanced out by the proper adjustment of resistor 24 in the well known manner.

A binary value opposing voltage producing circuit 25 is connected on one side to bridge 21 over the series combination of conductors 26 and 27, and on its other side through secondary winding 17 of the transformer 12 to a terminal 29. The opposing voltage producing circuit 25 includes a plurality of parallel branches connected between secondary 17 of transformer 12 and conductor 26. Each branch includes a contactor and a resistor representing a particular binary number. The contactor of each branch is operated by its appropriate coil winding controlled by stepping switch 56 and is so designated on the drawings. The resistor in each branch is designated similarly with the letter R in front of each number.

Between the terminal 30 which is the junction of conductors 26 and 27 and terminal 29 is a resistance bridge 31, including a fixed resistor 32 in shunt with a series connected fixed resistor 33 and a variable resistor 34. It is readily apparent that the circuit 25 is connected in series with bridge 31 and hence any adjustment of variable resistor 34 may be made to vary the total magnitude of the voltage drop across the circuit and bridge combined. In adjusting the resistor 34, the span of the weighing system may be readily adjusted. By the span of the system is meant the total amount of opposing voltage that must be generated to counteract the total amount of voltage generaed by the load cells for the maximum load capacity of the scale.

Any difference signal between the sum of the voltages created by cells 18 and 19 and the opposing voltage created by circuit 25 is amplified by a suitable amplifier 35, one side of the input of which is connected to cell 18 over conductor 36, and the other input side of which is connected over conductor 37 to terminal 29. Any output signal from amplifier 35 is applied over conductors 38 and 39 to a balance detector 40. Detector 40 determines the phase of any out of balance condition through internal relay coil windings (details not shown), which, in turn, control the position of a moveable armature 41. Detector 40 may be of any known design, such as, that disclosed and claimed in copending application filed February 21, 1952, having Serial No. 274,166, by Louis J. Lauler and Matthew T. Thorsson and assigned to the present assignee.

The armature 41, as shown in Figure 3—for illustrative purposes as being in a neutral position—will move to the left to close against contact 42 when a voltage produced by cells 18 and 19 is greater than the countervoltage produced by circuit 25. If the countervoltage produced by circuit 25 exceeds that voltage generated by the cells 18 and 19, then armature 41 will close against contact 43. Armature 41 is further shown connected to the primary 13 of transformer 12 over conductor 44.

Conductor 44 is connected to a terminal 45. The other side of primary 13 is connected over a conductor line 46 to the input side of a bridge-type rectifier 47. A conductor 48 connects terminal 45 of conductor 44 through a normally open contactor 49 to the other input side of bridge 47. The output leads 50 and 51 of bridge 47 are connected to a coil 52.

Whether or not the coil 52 is energized, is determined by normally open contactor 49. This contactor is periodically closed by a time delay circuit 53 connected to terminal 45 which includes an operating coil 54 for contactor 49, a condenser 55, and a rectifier element 54'. When the system is in operation, the time required to charge condenser 55 determines the amount of time the contactor 49 remains open. Rectifier 54' produces a rectified direct current which quickly charges condenser 55. Condenser 55 discharges slowly through coil 54 upon the opening of the charging circuit in a manner to be explained hereinafter and contactor 49 is then closed to prepare an energizing circuit for rectifier 47. The pulsating direct current from rectifier 47 flows through coil 52 which is the stepping control delay for wipers 61—63 of stepping switches 56—59.

To control the magnitude of the opposing voltage produced by circuit 25, stepping switches 56 and 57 are provided. To maintain delay circuit 53 in periodic operation a stepping switch 59 is provided. Contactor arms 60, 61, 62 and 63 of the switches 56–59 respectively are mechanically connected together and move simultaneously under the influence of the stepper coil 52 when it is energized. Thus it is seen that the similar contact terminals—lettered a, b, c, d, e, f, g, h, i and j—in the drawings, of switches 56—59 will be engaged by arms 60—63 at all times. The contact terminals actually are arranged in a circular pattern in equispaced side-by-side relationship with the conductor moving clockwise so that after contacting terminal j, each contactor arm will move clockwise to contactor termnial a. The arrangement in Figure 2 of the contactors was made for purposes of clarity.

A first relay circuit includes a plurality of relay coils K128, K64, K32, K16, K8, K4, K2, and K1 connected in parallel between the contact wafers and conductor 46. Connected in parallel between the wafer sides of each of the coils (K128–K1) of the circuit and a conductor 64 which in turn is connected to conductor 44 over the normally closed contacts of start switch 73, is a plurality of circuits including conductors 80–87, normally open contacts K128", K64", K32", K16", K8", K4", K2", K1", and normally closed contacts K128A', K64A', K32A', K16A', K8A', K4A', K2A', and K1A', each circuit being respectively connected to a corresponding one of coils K128–K1. The contactors K128″ through K1″ and K128A′ through K1A′, together with conductor 64 and normally closed contacts of start switch 73, constitute the holding portion of the first relay circuit.

A second relay circuit includes a plurality of relay coils K128A, K64A, K32A, K16A, K8A, K4A, K2A and K1A connected in parallel between the contact wafers of switch 57 and conductor 46. Condensers 100–107 are connected respectively across each of coils K128A–K1A and are charged through rectifier 200. The discharge time of the condensers must exceed the operating time of the stepping circuit to prevent chattering of the relay contacts.

A read out circuit comprising coils 65–72 is connected between conductor 46 and the contacts b–j of switch 58. Each read out coil is energized over a circuit completed by its associated one of the contacts K128‴–K1‴ upon closure in accordance with the actuation of its associated coil K128–K1. It should be noted that wiper 62 which moves in unison with the other wipers 60, 61 and 63, as actuated by coil 52, completes an energizing circuit for each of those read out coils whose corresponding contacts of the group K128‴–K1‴ are held closed by the resistor selection circuit. It should be further noted that each coil is terminated in a wafer contact (c–j) which is one step behind the wafer contact of the energizing circuit for the corresponding contact actuating relay. Consequently, after final actuation of each of the operated ones of the relays K128–K1, the corresponding read out relay is actuated. This latter arrangement becomes necessary inasmuch as an operated relay of the group K128–K1 may be released through the interruption of its holding circuit by the subsequent operation of one of the group of relays K128A–K1A. To prevent false actuation of the read out relay coils, they are energized only after final selection has been made of their corresponding K128–K1 relay coils.

In order to provide a permanent record of the weight of the unknown object, the read out coils 65–72 may be the binary actuating solenoids of an adding machine which is capable of binary to decimal conversion. Such an adding machine is commercially available as a Clary adding machine, Model No. 1970.99 manufactured and sold by the Clary Multiplier Corporation. Since the binary to decimal conversion system per se is not a part of the present invention, a detailed explanation of the commercially available circuit is not herein provided.

The general operation of the stepping system is automatic after the initial closure of a switch. Such a switch is provided at 73 and is normally biased to the open position. Assume that a load has been applied to platform 3 supported by cells 18 and 19, and that a measurement of that load is desired. The switch 73 is operated to close a circuit from one side of the primary winding 13 of the transformer over conductor 44, circuit 53, conductor 74, normally closed contactor 75, and conductor 46 which is connected to the other side of the primary. Normally closed conductor 75 is opened by the energization of coil 52 and interrupts an energizing circuit for coil 54 after the release of switch 73 and the movement of wiper 63 to wafer contacts b of switch 59. When the condenser 55 of delay circuit 53 is charged, coil 54 will close contactor 49 and complete a parallel circuit through the bridge circuit 47 and stepper-coil 52. Coil 52 will move the contactor arms 60, 61 and 62 to terminal b.

When coil 52 completes such movement, contact 75 opens to deenergize coil 54. When condenser 55 discharges and contactor 49 opens, coil 52 is deenergized to reclose contact 75 and restart the cycle.

With arm 60 of switch 56 on terminal b, and contactor arm 41 in its neutral position, the counterbalancing voltage circuit is prepared for operation. Since no opposing voltage is generated in circuit 25, the balance detector 40 senses an excess of voltage from load cells 18 and 19 and pulls armature 41 toward contact 42 to complete an energizing circuit for relay K128. Coil K128 will be energized closing contactor K128′ in circuit 25 and contactor K128″ in the holding circuit. This effectively inserts resistor R128 in the opposing voltage circuit 25 to oppose the voltage created by the load cells. Closure of contactor K128″ keeps the coil K128 energized to maintain R128 effective in circuit 25. The magnitude and phase of the difference voltage, if any, between the load cell voltage and that created in circuit 25 are amplified by amplifier 35 and applied to the balance detector 40. If the load cell voltage is greater than the opposing voltage created by the insertion of R128 in circuit 25, then the detector 40 will leave contactor 41 closed against contact 42. If the load cell voltage is less than the opposing voltage created by the insertion of R128 in circuit 25, then detector 40 will move contactor 41 against contact 43 establishing an operating circuit through coil K128A in circuit 57.

Energization of coil K128A opens normally closed contactor K128A′ in the holding circuit and deenergizes coil K128 of circuit 57. Contactor K128′ in circuit 25 opens under the control of coil K128 and removes R128 from the opposing voltage creating circuit. This step is the equivalent in a balance scale of adding too much weight to counterbalance a load, necessitating the use of a lighter counterbalance.

The delay circuit 53 allows just enough time for circuit 56 and, or 57, to operate before energizing stepper-coil 52 to move the contactor arms 60, 61, and 62 to terminal c. As is readily apparent, circuit 59 provides a convenient means to permit the energization of the delay circuit for periodically energizing stepper-coil 52. Each time contactor 49 is closed by the delay circuit 53 through the arm 63 and one of the terminals of switch 59, the coil 52 operates and arm 63 advances to the next terminal while contactor 49 opens and then the cycle repeats itself.

To further explain the operation of the system a specific example of weighing will be described. Assume that a load of 110 pounds is applicable to the platform 3 supported by the cells 18 and 19. To measure this load, the start switch 73 is momentarily closed energizing circuit 53 and closing contactor 49. This energizes coil 52, stepping arms 60, 61, 62 and 63 to terminal b. The operation of start switch 73 interrupts the holding circuit at terminals X and Y to release any relays K128–K1 which had been energized in a previous weighing operation and restore the balance circuit to its normal condition.

The balance circuit 40 senses an unbalance of voltage in the load cell circuit and moves armature 41 toward contact 42. With contact 41 closed against contact 42, coil K128 becomes energized and in turn closes contactor K128′ in circuit 25 and contactor K128″ in the holding circuit. Effectively then resistor K128, representing 128 pounds of opposing voltage as a binary value, is inserted in circuit 25. Since only 110 pounds was applied to the cells, it is obvious that R128 is too large a counterweight and consequently must be removed. A voltage signal representative of the difference between the voltage generated by the load cells and the balancing circuit 25 is generated and in this case is of a phase and magnitude indicating an excess counterbalancing voltage. This difference in phase and magnitude of the voltage created is detected by balance detector 40 which moves the contactor 41 away from contact 42 and into engagement with contact 43. This closes a circuit through arm 61, terminal b of switch 57, and coil K128A. Energization of the coil opens contactor K128A′ in the holding circuit. Opening of contactor K128A′ deenergizes coil K128 which in turn, opens previously closed contactor K128′ in circuit 25 and resistor R128 is dropped out. Without resistor R128 no effective opposing voltage is created by circuit 25 and hence the load cell voltage exceeds the voltage of circuit 25. The balance detector, therefore, moves contactor 41 back against contact 42 as the stepper-coil 52 is again operated to move arms 60, 61, 62 and 63 to terminal c.

A circuit is then established over switch 56 through arm 60 and terminal c through coil K64, which operates to close contactor K64' in circuit 25, contactor K64" in the holding circuit and contact K64''' in the read out circuit. Closure of contactor K64' inserts resistor R64 representing the binary value of 64 pounds of opposing voltage in circuit 25. With this opposing voltage generated by the insertion of resistor R64, the assumed load cell voltage still predominates so that detector 40 maintains contactor 41 on contact 42 and the stepper-coil 52 goes through another operation moving arms 60, 61, 62 and 63 to terminal d. Coil K64 remains energized since coil K64A in circuit 57 was never energized to open contactor K64' in the holding circuit for coil K64. With wiper 62 of read out circuit 58 on terminal d, and contact K64''' closed, an obvious energizing circuit for read out coil 66 is completed and the appropriate mechanism of the adding machine (not shown) is actuated to record the binary value of 64 pounds and prepare the adding machine to convert this binary value to a decimal system.

With arm 60 completing a circuit over terminal d, coil K32 is energized to close in turn, contactor K43' in circuit 25, contactor K32" in its own holding circuit, and contactor K32''' in the read out circuit. Closure of contactor K32' inserts resistor R32 representing, in binary form, an additional opposing voltage corresponding to 32 pounds. At this point then there is 64 pounds of opposing voltage plus 32 pounds or 96 pounds total. The load cell voltage of 14 pounds still exceeds the created opposing voltage so detector 40 maintains arm 41 against contact 42 as the stepper-coil 52 moves arms 60, 61, 62 and 63 to terminal e. As in the previous case, since coil K32A was not energized to open contactor K32A', then the holding circuit for K32 remained closed to keep resistor R32 in the circuit and contact K32''' closed in the read out circuit.

With arm 60 on terminal e the K16 coil is energized and, in turn, closes contactor K16' in circuit 25 and contactor K16" in its own holding circuit. This effectively inserts resistor R16 in the opposing voltage circuit 25. However, the addition of 16 pounds of voltage to the previously accumulated total of 96 pounds, would give 112 pounds, or an excessive amount. This over-voltage error is amplified by amplifier 35 and detected by detector 40, which moves contact arm 41 against contact 43. This closes a circuit through arm 61 and terminal e to coil K16A of circuit 57. Energized coil K16A opens contactor K16A' in the holding circuit for coil K16, thus de-energizing the coil and opening contactor K16' to remove resistor R16 from circuit 25. The deenergization of coil K16 also opens contact K16''' to prevent energization of read out coil 68 when wiper 62 steps to terminal f.

With wiper 62 of switch 58 on terminal e and contact K32''' closed, an obvious energizing circuit for read out coil 67, which indicates the addition of thirty-two pounds, is completed and this information is transmitted to the adding machine in the manner heretofore described.

With resistor R16 removed, the load voltage exceeds the created opposing voltage of circuit 25 and detector 40 moves arm 41 back to contact 42 as the stepper-coil 52 operates to move arms 60, 61, 62 and 63 to terminal f. With arm 60 in contact with terminal f of circuit 56, the coil K8 becomes energized to close contactor K8' in circuit 25, K8" in its own holding circuit and contact K8''' in the read out circuit. Closing contact K8' inserts resistor R8 effectively into circuit 25 to add an opposing voltage representing 8 pounds to the previously accumulated 96 pounds for a total of 104 pounds. Since this total is less than the load cell voltage, the detector 40 keeps arm 41 against contact 42, the holding circuit for the K8 coil remains energized, and the stepper-coil 52 operates to move the arms 60, 61, 62 and 63 to terminal g.

With arm 62 on terminal g, an energizing circuit is completed for read out coil 69 which actuates the adding machine circuit to register 8 additional pounds with the previously registered total of 96 pounds.

With arm 60 engaging terminal g in switch 56, coil K4 becomes energized to close contactor K4' in circuit 25 and contactor K4" in its own holding circuit, and contactor K4''' in the read out circuit. Closure of contactor K4' inserts resistor R4 effectively into circuit 25 adding 4 pounds of voltage to the previously accumulated total of 104 pounds for a total of 108 pounds. As the load cell voltage still exceeds this amount, contactor arm 41 remains engaged with contact 42, as the stepper-coil 52 again operates to move arms 60, 61, 62 and 63 to terminal h. Coil K4 remains energized through its holding circuit and at its contacts K4''' prepares an energizing circuit for read out coil 70. With arm 62 of switch 58 on terminal h, an energizing circuit is completed for read out coil 70 which actuates the adding machine to circuit to register 4 additional pounds to the previously accumulated total of 104 pounds.

With arm 60 of switch 56 engaging terminal h, coil K2 becomes energized to close contactor K2' in circuit 25, contactor K2" in its own holding circuit and contactor K2''' in the read out circuit. Closure of contactor K2' effectively inserts resistor R2 in the circuit 25 adding two more pounds of opposing voltage for a final total of 110 pounds. At this point the opposing voltage exactly counteracts the load cell voltage. Upon the next stepping of the arms 60, 61, 62 and 63 by coil 52 to terminal i, an energizing circuit for read out coil 71 is completed to actuate the adding machine to register an additional 2 pounds for a total of 110 pounds.

Inasmuch as the opposing voltage generated in circuit 25 equals the load cell voltage, balance detector 40 holds armature 41 in its neutral position and no operating circuit for relay K1 is completed. After an appropriate period of time determined by the discharge time of condenser 55, stepping coil 52 is energized to step the wipers 60-63 to terminal a. Since terminal a presents an open circuit to switch 59, the stepping relay coil 52 releases and the system is in a rest position.

It will be realized that the energized ones of the coils K128–K1 are held operated over their respective holding circuits until start button 73 is depressed to interrupt these holding circuits and restart the weighing operation.

It should be noted that only eight resistors, representing the members in the binary system were utilized in circuit 25. Actually, the range of the system may obviously be increased by the addition of resistors representing the next following binary numbers, such as 256, 512, 1024 and so forth. Suitable additional coils would be connected to additional terminals of switches 57 and 58 in an obvious manner and these switches would be expanded to accommodate the additional circuitry in an obvious manner.

This weighing or force measuring system, therefore, provides an automatic and accurate means to rapidly determine the magnitude of an applied load by the rapid selection of particular resistors representing binary system numbers to counteract the load and to subsequently condition a read out system.

While only one embodiment of the present invention has been described, numerous modifications, changes and rearrangements will suggest themselves to those skilled in the art and it is intended to include all such rearrangements and modifications in the accompanying claims:

I claim:

1. An electrical weighing system comprising means to produce a voltage in the system proportional to an applied load, binary number resistor means including a first and a second relay circuit to automatically produce in the system a voltage of equal magnitude and opposite phase to the load voltage, stepping circuit means including a plurality of comoving contactor arms and arranged to continue in operation uninterruptedly throughout a weighing cycle after its initial energization, time delay means connected in said stepper-circuit means to control the period between operations of the stepping means by controlling the energization of the actuating coil therein, balance detector means connected in circuit with said sensing means and said opposing voltage producing circuit to detect both phase and magnitude voltage differences between the voltage created by the sensing means and the voltage produced by the opposing voltage circuit, a contactor operated by said balance detector to close a circuit through a comoving contactor arm of the stepping means to either the first relay circuit or the second relay circuit depending on the phase of the voltage detected, certain of said coils in said first relay circuit being initially energized by the closure of said detector and being held energized by their own holding circuits to maintain certain of of the binary value resistors in the opposing voltage producing circuit effective to create, after a complete stepping cycle, a voltage in the opposing voltage circuit of equal magnitude and opposite phase to the applied load voltage, and read-out coil means for the system including read-out coil windings operative in accordance with those parallel resistance paths remaining closed in the opposing voltage producing circuit.

2. An electrical weighing system comprising means to sense a load applied to the system and to insert a voltage into the system proportioned thereto, an opposing voltage-producing circuit in said system, said circuit including a plurality of resistors representing particular numbers in the binary numbering system, a balance detector means in said system to render certain of said binary resistors effective to produce a voltage of equal magnitude and opposite phase to that created by the sensing means, and means to read out the value of the load applied to the system in accordance with the created opposing voltage.

3. An electrical weighing system comprising means to sense a load applied to the system and to insert a voltage into the system proportional thereto, an opposing voltage-producing circuit in said system, said circuit including a plurality of of resistors representing particular numbers in the binary numbering system, relay means to control the insertion of each resistor in the opposing voltage circuit, relay means to control the removal of each resistor from the opposing voltage circuit, detector means to render either the inserting or removing relay means for each resistor effective, stepping means to successively condition all of said relay means during a weighing operation, holding circuit means for each of said resistor inserting relay means, said holding circuit means retaining the resistors in the opposing voltage producing circuit which were not removed by the action of the detector means and the removing relay means to create an opposing voltage of equal magnitude and opposite phase to the load voltage, and means conditioned by the opposing voltage circuit to control a read-out circuit.

4. The system as set forth in claim 3, and being further characterized by a time delay circuit to control the period between operations of the stepping means.

5. An electrical weighing system comprising means to sense a load applied to the system and to insert a voltage into the system proportioned thereto, an opposing voltage producing circuit in said system, said circuit including a plurality of parallel paths each having a normally open contactor and a resistor representing a particular number in the binary numbering system, a first relay circuit, said relay circuit including a plurality of coils, each controlling a contactor in one path of said opposing voltage producing circuit, a holding circuit for each coil in the relay circuit, said holding circuit in each case including a normally open contactor and a normally closed contactor, a second relay circuit including a plurality of coils corresponding to the coils of the first relay circuit, each of which, when energized, acts to open a normally closed contactor in the holding circuit for a coil in the first relay circuit, a third relay circuit comprising a plurality of read-out coils and normally open contactors closed individually in conjunction with the coils in said first relay circuit stepping means to successively and simultaneously condition said relay coils of each relay circuit for energization, means operative at each step of the stepping means to detect both phase and magnitude voltage differences between the applied load voltage and the voltage produced by said voltage-producing circuit and to render either a coil of the first relay circuit or a corresponding coil in the second relay circuit energized to thereby retain or remove a resistor from the opposing voltage producing circuit, thereby selectively creating, after a complete stepping cycle, a voltage in the opposing voltage circuit of equal magnitude and opposite phase to the load voltage, and means conditioned by the opposing voltage circuit to control a read-out circuit.

6. The system as set forth in claim 5 and being further characterized by a time delay circuit to control the period between operations of the stepping means.

7. An electrical weighing system comprising means to sense a load applied to the system and to insert a voltage into the system proportioned thereto, an opposing voltage producing circuit in said system, said circuit including a plurality of parallel paths each having a normally open contactor and a resistor representing a particular number in the binary numbering system, a first relay circuit, said relay circuit including a plurality of coils, each controlling a contactor in one path of said opposing voltage producing circuit, a holding circuit for each coil in the relay circuit, said holding circuit in each case including a normally open contactor and a normally closed contactor, a second relay circuit including a plurality of coils corresponding to the coils of the first relay circuit, each of which, when energized, acts to open a normally closed contactor in the holding circuit for a coil in the first relay circuit, stepping means to successively and simultaneously condition said relay coils of each relay circuit for energization, time delay means to control the period between operation of the stepping means, means operative at each step of the stepping means to detect both phase and magnitude voltage differences between the applied load voltage and the voltage produced by said voltage-producing circuit and to render either a coil of the first relay circuit or a corresponding coil in the second relay circuit energized to thereby retain or remove a resistor from the opposing voltage producing circuit, thereby selectively creating, after a complete stepping cycle, a voltage in the opposing voltage circuit of equal magnitude and opposite phase to the load voltage, means conditioned by said first relay circuit to control a read-out circuit, and normally closed contactor means in circuit with all of said holding circuits acting when opened to deenergize all of the coils of the first relay circuit which may have been held energized during a weighing operation and to thereby clear the system of such resistors retained in the opposing voltage producing circuit by those coils.

8. An electrical weighing system comprising means to sense a load applied to the system and to insert a voltage into the system proportioned thereto, an opposing voltage producing circuit in said system, said circuit including a plurality of parallel paths each having a normally open contactor and a resistor representing a particular number in the binary numbering system, a first relay circuit, said relay circuit including a plurality of coils, each controlling a contactor in one path of said opposing voltage producing circuit, a holding circuit for each coil in the relay circuit, said holding circuit in each case including a normally open contactor and a normally closed contactor, a second relay circuit including a plurality of coils corresponding to the coils of the first relay circuit, each of which, when energized, acts to open a normally closed contactor in the holding circuit for a coil in the first relay circuit, stepping means to successively and simultaneously condition said relay coils of each relay circuit for energization, means to initially energize the stepping means, automatic circuit means to render said stepping means operative through a cycle, time delay means in said automatic circuit means to control the period between operations of the stepping means by controlling the energization thereof, means operative at each step of the stepping means to detect both phase and magnitude voltage differences between the applied load voltage and the voltage produced by said voltage-producing circuit and to render either a coil of the first relay circuit or a corresponding coil in the second relay circuit energized to thereby retain or remove a resistor from the opposing voltage-producing circuit, thereby selectively creating, after a complete stepping cycle, a voltage in the opposing voltage circuit of equal magnitude and opposite phase to the load voltage, means conditioning said first relay circuit to control a read-out circuit, and normally closed contactor means in circuit with all of said holding circuits acting when opened to deenergize all of the coils of the first relay circuit which may have been held energized during a weighing operation and to thereby clear the system of such resistors retained in the opposing voltage producing circuit by those coils.

9. A force measuring system comprising load cell means to sense a force applied to the system and to insert a voltage into the system proportional thereto, an opposing voltage producing circuit in said system, said circuit including a plurality of resistors representing particular numbers in the binary numbering system, detector means in said system to select certain of said binary resistors and render them effective to produce a voltage of equal magnitude and opposite phase to that created by the load cell means, amplifier means in circuit with said load cell means and said opposing voltage producing circuit, said amplifier amplifying any voltage difference between the load cell voltage and the opposing circuit voltage to activate the detector means, and means responsive to the final circuit arrangement of said opposing voltage circuit to condition a read-out circuit for indicating the magnitude of the applied force.

10. An electrical weighing system comprising means to sense a load applied to the system and to insert a voltage into the system proportional thereto, an opposing voltage-producing circuit in said system, said circuit including a plurality of parallel paths, each having a normally open contactor and a resistor representing a particular number in the binary numbering system, a first relay circuit, said relay circuit including a plurality of coils each controlling a contactor in one path of said opposing voltage producing circuit, a holding circuit for each coil in the relay circuit, said holding circuit in each case including a normally open contactor and a normally closed contactor, a second relay circuit including a plurality of coils corresponding to the coils of the first relay circuit, each of which, when energized, acts to open a normally closed contactor in the holding circuit for a coil in the first relay circuit, stepping means including an actuating coil and a plurality of co-moving contactor arms to successively and simultaneously condition corresponding coils in said relay circuits for energization, means to initially energize the stepping means, stepping circuit means to automatically maintain said stepping means in a closed circuit throughout a weighing cycle after its initial energization, time delay means connected in said stepper-circuit means to control the period between operations of the stepping means by controlling the energization of the actuating coil therein, balance detector means connected in circuit with said sensing means and said opposing voltage producing circuit to detect both phase and magnitude voltage differences between the voltage created by the sensing means and the voltage produced by the opposing voltage circuit, a contactor operated by said balance detector to close a circuit through a co-moving contactor arm of the stepping means to either the first relay circuit or the second relay circuit depending on the phase of the voltage detected, certain of said coils in said first relay circuit being initially energized by the closure of said detector and being held energized by their own holding circuits to maintain certain of the binary value resistors in the opposing voltage producing circuit effective to create, after a complete stepping cycle, a voltage in the opposing voltage circuit of equal magnitude and opposite phase to the applied load voltage, and read-out means for the system including read-out coil windings operative in accordance with those parallel resistance paths remaining closed in the opposing voltage producing circuit.

11. An electrical weighing system comprising means for sensing a load applied to the system and for inserting a voltage into the system proportional thereto; an opposing-voltage producing circuit in said system, said circuit including a plurality of resistors of different resistance values; a first relay means for inserting said resistors individually in said opposing-voltage producing circuit in a sequence of descending resistance values; a second relay means adapted to remove selected ones of said resistors from said opposing voltage producing circuit in a sequence of descending resistance values, and detector means for rendering said first relay means effective to insert each resistor in the selected sequence in said opposing-voltage producing circuit and for rendering said second relay means effective to remove certain ones of said resistors in a sequence of descending resistance values.

12. An electrical weighing system comprising means for sensing a load applied to the system and for inserting a voltage into the system proportional thereto; an opposing-voltage producing circuit in said system, said circuit including a plurality of resistors of different resistance values; a first relay means comprising a plurality of relays, each relay being adapted to control the insertion of a corresponding one of said resistors into said opposing-voltage producing circuit; a second relay means comprising a plurality of relays, each relay being adaped to remove a corresponding one of said resistors from said opposing-voltage producing circuit, and detector means sensitive to the phase and amplitude of the difference voltage signal between said load generated voltage and said opposing-voltage signal for rendering said inserting relay means effective to insert each resistor in a sequence of descending resistance values in said opposing-voltage producing circuit, and for rendering said second relay means effective to remove certain ones of said resistors in a sequence of descending resistance values.

13. An electrical weighing system comprising means for sensing a load applied to the system and for inserting a voltage into the system proportional thereto; an opposing-voltage producing circuit in said system, said circuit including a plurality of resistors of different resistance values; a first relay means for inserting said resistors individually in said opposing-voltage producing circuit in a sequence of descending resistance values; a second relay means adapted to remove selected ones of said resistors from said opposing-voltage producing circuit in a sequence of descending resistance values, detector means for rendering said first relay means effective to insert each resistor in the selected sequence in said opposing-voltage producing circuit and for rendering said second relay means effective to remove certain ones of said resistors in a sequence of descending resistance values.

14. An electrical weighing system comprising means for sensing a load applied to the system and for inserting a voltage into the system proportional thereto; an opposing-voltage producing circuit in said system, said circuit including a plurality of resistors of different resistor values; a first relay means for inserting said resistors individually in said opposing-voltage producing circuit in a sequence of descending resistance values; a second relay means adapted to remove selected ones of said resistors from said opposing-voltage producing circuit in a sequence of descending resistance values, detector means for rendering said first relay means effective to insert each resistor in the selected sequence in said opposing-voltage producing circuit and for rendering said second relay means effective to remove certain ones of said resistors in a sequence of descending resistance values, and a stepping means to successively condition all of said relay means during a weighing operation.

15. The system as set forth in claim 14, and being further characterized by a delay circuit to control the period between operations of the stepping means.

16. An electrical weighing system comprising means for sensing a load applied to the system and for inserting a voltage into the system proportional thereto; an opposing-voltage producing circuit in said system, said circuit including a plurality of resistors of different resistance values, a first relay means for inserting said resistors individually in said opposing-voltage producing circuit in a sequence of descending resistance values; a second relay means adapted to remove selected ones of said resistors from said opposing-voltage producing circuit in a sequence of descending resistance values, and holding circuit means for each of said relays in said first relay means, said holding circuit means retaining the resistors in the opposing-voltage producing circuit which were not removed by said second relay means to create an opposing voltage of equal magnitude and opposite phase to the load generated voltage.

References Cited in the file of this patent

UNITED STATES PATENTS

| | | |
|---|---|---|
| 2,688,477 | Lindars | Sept. 7, 1954 |
| 2,733,911 | Thurston | Feb. 7, 1956 |